United States Patent
Richter et al.

(10) Patent No.: US 10,023,025 B2
(45) Date of Patent: Jul. 17, 2018

(54) HEAT MANAGEMENT SYSTEM FOR AN INTERNAL COMBUSTION ENGINE

(71) Applicant: Bayerische Motoren Werke Aktiengesellschaft, Munich (DE)

(72) Inventors: Rainer Richter, Munich (DE); Wolfgang Hofmann, Otterfing (DE); Wolfram Enke, Meissen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 5 days.

(21) Appl. No.: 15/217,738

(22) Filed: Jul. 22, 2016

(65) Prior Publication Data

US 2016/0325601 A1    Nov. 10, 2016

Related U.S. Application Data

(63) Continuation of application No. PCT/EP2015/050670, filed on Jan. 15, 2015.

(30) Foreign Application Priority Data

Jan. 23, 2014 (DE) .................. 10 2014 201 167

(51) Int. Cl.
*F01P 11/16* (2006.01)
*B60H 1/00* (2006.01)
(Continued)

(52) U.S. Cl.
CPC .......... *B60H 1/00885* (2013.01); *B60H 1/04* (2013.01); *F01P 7/14* (2013.01); *F01P 7/167* (2013.01); *F01P 11/08* (2013.01); *F01P 11/16* (2013.01); *F01P 7/16* (2013.01); *F01P 11/029* (2013.01); *F01P 2005/105* (2013.01);
(Continued)

(58) Field of Classification Search
CPC .......... F01P 2007/146; F01P 7/14; F01P 7/16; F01P 3/20
See application file for complete search history.

(56) References Cited

U.S. PATENT DOCUMENTS 6,164,248 A    12/2000 Lehmann
6,371,060 B1    4/2002 Lehmann et al.
(Continued)

FOREIGN PATENT DOCUMENTS

CN    1826458 A    8/2006
CN    101158307 A    4/2008
(Continued)

OTHER PUBLICATIONS

PCT/EP2015/050670, International Search Report dated Mar. 25, 2015 (Two (2) pages).
(Continued)

*Primary Examiner* — Long T Tran
(74) *Attorney, Agent, or Firm* — Crowell & Moring LLP

(57) ABSTRACT

A heat management system for an internal combustion engine has an engine cooling circuit, a main cooling circuit that has a main cooler, a heating circuit that has a heating heat exchanger, a coolant pump that moves coolant through the circuits and a rotary slide valve that has at least one switched and at least one non-switched inlet, such that the heating return flow leads into a switchable inlet of the rotary slide valve.

15 Claims, 2 Drawing Sheets

(51) Int. Cl.
   *B60H 1/04* (2006.01)
   *F01P 7/14* (2006.01)
   *F01P 11/08* (2006.01)
   *F01P 7/16* (2006.01)
   *F01P 11/02* (2006.01)
   *F01P 5/10* (2006.01)

(52) U.S. Cl.
   CPC ... *F01P 2007/143* (2013.01); *F01P 2007/146* (2013.01); *F01P 2025/32* (2013.01); *F01P 2037/02* (2013.01); *F01P 2060/045* (2013.01); *F01P 2060/08* (2013.01); *F01P 2060/12* (2013.01)

(56) References Cited

U.S. PATENT DOCUMENTS

| | | | |
|---|---|---|---|
| 6,539,899 B1* | 4/2003 | Piccirilli | F01P 7/167 123/41.08 |
| 7,131,460 B2 | 11/2006 | McLane et al. | |
| 8,671,982 B2* | 3/2014 | Stoermer | F16K 11/0856 123/41.1 |
| 8,757,110 B2 | 6/2014 | Triebe et al. | |
| 9,273,591 B2 | 3/2016 | DiPaola et al. | |
| 2002/0148243 A1* | 10/2002 | Feuerecker | B60H 1/323 62/244 |
| 2006/0157000 A1* | 7/2006 | Lutze | F01P 3/20 123/41.02 |
| 2010/0282190 A1* | 11/2010 | Stoermer | F16K 11/0856 123/41.08 |
| 2011/0272049 A1 | 11/2011 | Jorgensen et al. | |
| 2013/0047940 A1* | 2/2013 | Quix | F01P 7/165 123/41.08 |
| 2013/0167786 A1* | 7/2013 | Mehring | F02F 1/10 123/41.82 R |
| 2013/0186351 A1* | 7/2013 | Quix | F01P 5/10 123/41.02 |
| 2014/0007824 A1 | 1/2014 | Hayashi et al. | |

FOREIGN PATENT DOCUMENTS

| | | |
|---|---|---|
| CN | 201526364 U | 7/2010 |
| CN | 102414415 A | 4/2012 |
| CN | 202645705 U | 1/2013 |
| CN | 103075239 A | 5/2013 |
| CN | 203081557 U | 7/2013 |
| DE | 198 09 124 A1 | 9/1999 |
| DE | 199 57 145 A1 | 6/2001 |
| DE | 10 2005 035 121 A1 | 2/2007 |
| DE | 10 2006 050 826 A1 | 5/2008 |
| DE | 602 24 437 T2 | 8/2008 |
| DE | 11 2007 001 140 T5 | 4/2009 |
| DE | 10 2009 020 187 A1 | 11/2010 |
| EP | 0 940 566 A2 | 9/1999 |
| FR | 2 800 125 A1 | 4/2001 |
| WO | WO 2008/053089 A1 | 5/2008 |

OTHER PUBLICATIONS

German Search Report issued in German counterpart application No. 10 2014 201 167.1 dated Mar. 28, 2014, with Statement of Relevancy (Five (5) pages).

Chinese Office Action issued in Chinese counterpart application No. 201580002639.6 dated Oct. 9, 2017 (Seven (7) pages).

* cited by examiner

HEAT MANAGEMENT SYSTEM FOR AN INTERNAL COMBUSTION ENGINE

CROSS REFERENCE TO RELATED APPLICATIONS

This application is a continuation of PCT International Application No. PCT/EP2015/050670, filed Jan. 15, 2015, which claims priority under 35 U.S.C. § 119 from German Patent Application No. 10 2014 201 167.1, filed Jan. 23, 2014, the entire disclosures of which are herein expressly incorporated by reference.

BACKGROUND AND SUMMARY OF THE INVENTION

The invention relates to a heat management system for an internal combustion engine.

The heat management of the coolant circuits of an internal combustion engine has a great influence on fuel consumption. In particular, operation of the engine at optimum temperatures, and efficient operation of consumers, such as for example a vehicle interior heater, but also rapid heating of the engine and transmission oil, assist in saving fuel.

DE 10 2005 035 121 A1 presents a cooling system which makes it possible for a valve arranged in the heating circuit to throttle or entirely stop the throughflow to the heater as required. It is however a disadvantage here that an additional component, namely the valve, must be installed.

It is an object of the invention to provide a simple and inexpensive heat management system by means of which the individual coolant circuits of the internal combustion engine can be controlled in a flexible manner.

This is achieved according to the invention in the case of a heat management system for an internal combustion engine, having an engine cooling circuit, a main cooler circuit with a main cooler, a heating circuit with a heating heat exchanger, a coolant pump which moves coolant through the circuits, and a rotary slide valve with at least one switched and at least one non-switched inlet, wherein the heating return line issues into a switched inlet of the rotary slide valve.

In very general terms, the rotary slide valve offers the advantage of a temperature-independent switching capability, which considerably increases the flexibility of the heat management system in relation to a conventionally used wax thermostat. Owing to the combination of switched and non-switched inlets, the rotary slide valve itself can be kept simple in terms of construction and thus inexpensive and small in terms of structural size.

The configuration according to the invention offers the possibility of the heating circuit being shut off or throttled in temperature-independent fashion when no heating function is required. Owing to the reduced heat output and the reduced flow resistance for the coolant as a result of the omission of the heating circuit from the flow path, fuel consumption is reduced.

Since the heating circuit can be addressed separately, it is also possible for the flow conditions therein to be selected such that an improved supply with heat is achieved, for example by way of an increased volume flow through the heating heat exchanger, with altogether lower energy consumption.

In general, a rotary slide valve switches considerably more quickly than a thermostat valve. This makes it possible for the internal combustion engine, in the part-load range, in which the main cooler circuit is not open or is open only with a throttling action, to be operated warmer, that is to say with a higher coolant temperature, than before, because sudden increases in load and thus temperature in the engine region can, by adjustment of the rotary slide valve, be responded to quickly enough to keep the coolant temperature in the optimum range. For this purpose, it is for example possible for the heating circuit to be briefly shut off in targeted fashion in order to increase a volume flow through the main cooler circuit.

On the other hand, the heating circuit may also be used to reduce a volume flow through the engine cooling circuit, for example by virtue of a bypass return line from the engine cooling circuit to the rotary slide valve being shut off or throttled, and thus only a much smaller volume flow being moved through the heating circuit. Throttling of the flow through the engine cooling circuit ensures uniform and nevertheless reduced cooling of the internal combustion engine, such that the latter reaches its optimum operating temperature more quickly in the event of a cold start.

Here, the engine cooling circuit forms the so-called "small cooling circuit", in which flow passes substantially only through the engine region, for example the cylinder head housing and the crankcase, but not through the air-cooled main cooler of the vehicle.

It is also possible for the flow through the engine cooling circuit or through the crankcase to be throttled in order to increase the heating action.

The outlet of the rotary slide valve preferably leads directly into the engine cooling circuit inlet, and is of non-switched design.

The coolant pump is for example arranged downstream of the outlet of the rotary slide valve and inward, in terms of flow, of the inlet of the engine cooling circuit into the engine region, in or in the immediate vicinity of an engine block of the internal combustion engine.

The return line of the main cooler circuit and/or a return line of the engine cooling circuit preferably issue(s) into in each case one switched inlet of the rotary slide valve. By way of the switchable return of the engine cooling circuit into the rotary slide valve, it is possible for a bypass (formed for example by the small cooling circuit) to be realized in a simple manner.

The rotary slide valve is advantageously arranged close to the engine in order to keep the flow paths, for example in the small cooling circuit, short. In the case of relatively short engines, for example a four-cylinder in-line engine, it is possible for the rotary slide valve to be positioned on the end side of the engine block, preferably in the immediate vicinity of the coolant pump that is optionally integrated into the engine block. By contrast, in the case of relatively long engines, for example a six-cylinder in-line engine, it is often advantageous, for space reasons, for the rotary slide valve to be arranged on the long side of the engine block.

A transmission oil cooling circuit having a transmission oil heat exchanger is normally provided. The return line thereof preferably issues into a non-switched inlet of the rotary slide valve. The transmission oil cooling circuit makes do with relatively inert temperature regulation, such that it is possible for a dedicated thermostat valve to be provided in the transmission oil cooling circuit, said dedicated thermostat valve being designed in particular as a conventional wax thermostat. In this way, the transmission oil cooling circuit can be configured in parallel with respect to the other cooling circuits, and can be coupled to the other cooling circuits, in particular to the engine cooling circuit, by way of the rotary slide valve. The transmission oil cooling circuit is switched in autonomous fashion by way of its dedicated thermostat valve. In this way, a control position of the rotary slide valve can be omitted.

The transmission oil cooling circuit is preferably decoupled from the other cooling circuits and may, in the warm-up phase, be shut off by way of the oil-side regulation in order to prevent heating of the coolant in the transmission oil cooling circuit, and thus assist the warm-up of the internal combustion engine.

An engine shut-off valve is preferably provided which can, for example, shut off a coolant feed line to the internal combustion engine downstream of the coolant pump.

In a warm-up phase, it is possible for all of the switchable inlets of the rotary slide valve to be closed, and thus for a flow through the engine cooling circuit to also be substantially throttled.

Here, the engine shut-off valve is preferably also closed, because this assists in preventing cavitation on the suction side of the coolant pump.

In the cooling circuits, there is normally provided a coolant expansion tank which can accommodate a certain volume of coolant and by which air can flow out to the surroundings.

The expansion tank is preferably connected to a non-switched inlet of the rotary slide valve.

In another possible embodiment, the expansion tank is connected to a switched inlet of the rotary slide valve. This makes it possible, for example during a cold start of the internal combustion engine, to prevent coolant circulation through the expansion tank, such that the coolant volume stored therein is not heated and said amount of heat is available for faster warm-up of the internal combustion engine. The coolant pump is preferably mechanically driven, wherein the drive is coupled to the internal combustion engine. It would however also be possible for an electrically driven main coolant pump to be used.

In the case of a mechanically driven coolant pump being used, it is advantageous for an additional electric coolant pump to be provided which permits a coolant movement through the coolant circuits even when the internal combustion engine is at a standstill, for example after an end of operation.

It is possible for the additional coolant pump to be arranged in an exhaust-gas turbocharger cooling circuit. This may be connected to the other cooling circuits via a non-switched inlet of the rotary slide valve. In another embodiment, the exhaust-gas turbocharger cooling circuit issues into the main return line of the engine cooling circuit.

The exhaust-gas turbocharger cooling circuit is preferably not controlled by way of the rotary slide valve if, in the afterrun situations after the operation of the internal combustion engine, it is necessary for the coolant movement in all of the cooling circuits through which flow must still pass to be effected by said exhaust-gas turbocharger cooling circuit by way of its additional coolant pump, and said exhaust-gas turbocharger cooling circuit may thus always be open.

It is however also possible for the additional coolant pump to be actuated in targeted fashion in order to conduct coolant into particular circuits by way of particular positions of the rotary slide valve. For example, it is possible for the rotary slide valve to be switched such that warm coolant is conducted by way of the additional coolant pump into the heating circuit in order to increase the heating power, for example in the case of the internal combustion engine being switched off in the context of an automatic start-stop system (MSA) or for other reasons.

A control unit and temperature sensors are preferably provided in the individual coolant circuits, and the rotary slide valve can preferably be switched by way of the control unit in a manner dependent on data determined by the temperature sensors.

The heat management system preferably has characteristic map-based control, in which specific data for the respective positions of the rotary slide valve in particular operating ranges are stored in the control unit. It is also possible for other vehicle data to be incorporated into the control of the rotary slide valve, for example a selected driving style, the present or desired fuel consumption, a position predictable via GPS, the outside temperature, or the presently engaged gear.

The invention will be described in more detail below on the basis of two exemplary embodiments and with reference to the appended drawings, in which:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
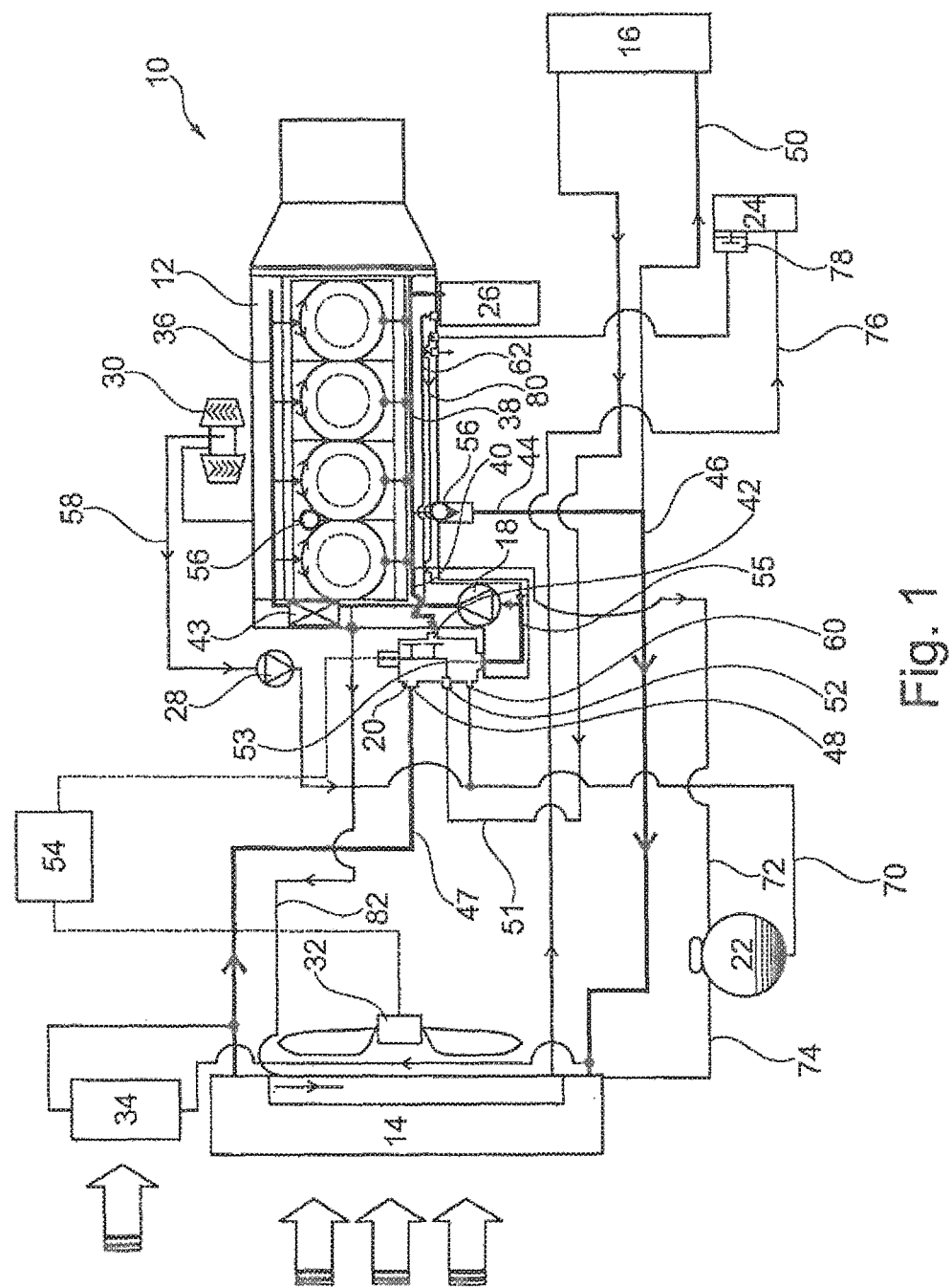
FIG. 1 shows a schematic view of a heat management system according to one embodiment of the invention.

FIG. 1 shows a heat management system 10 for an internal combustion engine 12 (in this case an in-line four-cylinder Otto-cycle engine).

Coolant flows, in multiple coolant circuits, inter alia through an engine block of the internal combustion engine 12, through an air-cooled main cooler 14, and through a heating heat exchanger 16. The coolant is moved primarily by way of a coolant pump 18, which in this case is mechanically driven.

The coolant flows are controlled by way of a rotary slide valve 20, the inlets of which are connected to the return lines of the coolant circuits, and the outlet of which is directly connected in terms of flow to the coolant pump 18, as will be described in detail further below.

Also provided are a coolant expansion tank 22, a transmission oil heat exchanger 24, an engine oil heat exchanger 26, and an additional, electrically operated coolant pump 28, wherein the latter is fluidically connected to a heat exchanger (housing cooling) of an exhaust-gas turbocharger 30. The electrically driven additional coolant pump 28 has a power of approximately 20-150 W, in this example.

The main cooler 14 is assisted by way of a fan 32. Furthermore, an additional cooler 34 is provided for assisting the main cooler, which additional cooler may for example be formed as a cooler mounted in a wheel arch.

In an engine cooling circuit 36 (also referred to as "small cooling circuit"), cold coolant is transported by the coolant pump 18 to an engine block of the internal combustion engine 12, more precisely to cooling ducts in the cylinder head housing and in the crankcase, where said coolant absorbs waste heat, before being collected in a line 38. A bypass line 40 leads from the collecting line 38 to a first switched inlet 42 of the rotary slide valve 20. The bypass line 40 also forms the return line of the engine cooling circuit 36.

Here, the engine cooling circuit 36 can be shut off, with regard to its conducting of coolant, downstream of the coolant pump 18.

From the collecting line 38 there branches off a coolant line 44 which is part of a main cooler circuit 46 which leads back, through the main cooler 14 and via a return line 47, to a switched second inlet 48 of the rotary slide valve 20.

From the line 44 there branches off a feed line to a heating circuit 50, in which the heating heat exchanger 16 is arranged, which can release heat to a vehicle interior compartment. The return line 51 of the heating circuit 50 leads to a third switched inlet 52 of the rotary slide valve 20.

A single, non-switched outlet 53 of the rotary slide valve 20 leads via a short line 55 to the coolant pump 18.

The position of the one or more rotary slides of the rotary slide valve 20, and thus the degree of opening of the switched inlets 42, 48, 52, is predefined by a control unit 54, which may form part of an engine electronics unit. In the control unit 54 there are stored data which permit characteristic map-based control in a manner dependent on predefined operating states of the internal combustion engine 12. In this example, the states of further components, such as the heating heat exchanger 16, the exhaust-gas turbocharger 30 and the engine oil heat exchanger 26, and data from temperature sensors 56 in the engine block or in the coolant line 44 to the main cooler 14, are also taken into consideration. The positions of the switched inlets of the rotary slide valve 20 are defined in a manner dependent on said parameters.

The additional electric coolant pump 28 is situated in an exhaust-gas turbocharger cooling circuit 58, which cools exhaust-gas turbocharger 30 and which issues into a non-switched inlet 60 of the rotary slide valve 20. A supply is provided to the exhaust-gas turbocharger cooling circuit 58 from the engine cooling circuit 36 by way of a branch (not shown in any more detail here).

The engine oil heat exchanger 26 is connected directly to the collecting line 38 of the engine cooling circuit 36. Cold coolant is supplied by way of a branch 62 downstream of the coolant pump 18. In this example, a controller is not provided but could be realized by way of an additional thermostat.

The coolant expansion tank 22 leads via a connecting line 70 to the return line of the exhaust-gas turbocharger cooling circuit 58, which issues into the non-switched inlet 60 of the rotary slide valve 20. The ventilation lines 72 and 74 connect the coolant expansion tank 22 to the engine cooling circuit 36, more specifically to the collecting line 38 and to the feed line to the main cooler 14 in the main cooler circuit 46. The transmission oil heat exchanger 24 is situated in a transmission oil cooling circuit 76 which is independent of the rotary slide valve 20, and said transmission oil heat exchanger is switched by way of a dedicated thermostat valve 78. The latter is in this case a conventional wax thermostat which opens the transmission oil cooling circuit 76 in the presence of a predetermined temperature, and closes said transmission oil cooling circuit below said temperature.

The transmission oil cooling circuit 76 leads through the engine block into a feed line 80, which issues into the coolant line 55. The issuing-in point lies upstream of the coolant pump 18 but downstream of the outlet 53 of the rotary slide valve 20. A line 82 branches off from the engine cooling circuit 36 between the coolant pump 18 and the engine shut-off valve 43, said line leading through the main cooler 14 and back to the transmission oil heat exchanger 24 (low-temperature loop). This is required only in the case of vehicles with transmission cooling.

The coolant pump 18 is in this case directly integrated into the engine block of the internal combustion engine 12. In this exemplary embodiment, the rotary slide valve 20 is mounted on the end side of the engine block of the internal combustion engine 12, in the immediate vicinity of the coolant pump 18.

If the inlet 48 of the rotary slide valve 20 is closed by the control unit 54, the coolant flow through the main cooler 14 in the main cooler circuit 46 is stopped. This state is assumed in particular upon starting of the internal combustion engine 12 and in part-load operation.

If the inlet 42 of the rotary slide valve 20 is open, the coolant flows via the bypass line 40 from the hot side of the internal combustion engine 12 directly into the rotary slide valve 20, and is recirculated from there directly to the cold side of the internal combustion engine 12 by way of the coolant pump 18.

If the inlet 52 of the rotary slide valve 20 is switched so as to be open, it is furthermore the case that coolant flows through the heating circuit 50 via the heating heat exchanger 16.

The switching of the inlets 42 and 52 makes it possible to realize multiple operating states. If both the inlet 42 and the inlet 52 are open, the engine cooling circuit 36 and the heating circuit 50 are flowed through in parallel. Here, the flow conditions are selected such that a considerably greater volume flow passes through the engine cooling circuit 36 than through the heating circuit 50, as is known. In this operating state, it is for example possible for the internal combustion engine 12 to warm up to its operating temperature, with the vehicle interior compartment simultaneously being heated.

If the inlet 42 is completely or partially closed, the flow through the engine cooling circuit 36 is reduced, such that the load on the coolant pump 18 is reduced. By way of the open heating circuit 50, heat can be released, and a targeted circulation of the coolant can be maintained. Owing to the relatively high flow resistance, the coolant volume flow through the internal combustion engine 12 is reduced. This can be utilized for a faster warm-up upon a cold start.

If the inlet 52 is switched so as to be entirely or partially closed, the heating circuit 50 is decoupled and flow does not pass through it. This is the case firstly when no heating function is desired, that is to say the vehicle occupants have switched off the heater.

Another usage case is a driving situation in which the load of the internal combustion engine 12 suddenly increases, for example when ascending a hill or upon an abrupt onset of acceleration. In this case, the closing of the heating circuit 50 in combination with the opening of the inlet 42 of the engine cooling circuit 36, and possibly of the inlet 48 of the main cooler circuit 46, has the effect that the entire coolant flow is available for the cooling of the internal combustion engine 12, such that temperature peaks are avoided.

In the warm-up phase of the internal combustion engine, the inlets 42, 48 and 52 can be closed in order to (substantially) stop a flow of the coolant in the engine cooling circuit 36, too, and thus realize a faster warm-up. To prevent cavitation on the suction side of the coolant pump 18, it is also the case here that the engine shut-off valve 43 is closed.

The activation and deactivation of the main cooler circuit 46 are realized by opening and closing of the inlet 48 of the rotary slide valve 20. This may (in the context of the predefined design of the rotary slide valve 20) take place independently of the opening and shutting-off of the engine cooling circuit 36 and of the heating circuit 50, and furthermore in temperature-independent fashion by way of commands from the control unit 54.

The flow through the engine may in this case be controlled, inter alia in the warm-up and in relevant consumption cycles, and by actuation of the rotary slide valve 20 and of the engine shut-off valve 43, for optimum heat distribution and friction optimization. These functions are also stored in the control unit 54.

The control unit 54 furthermore has a stored ventilation program which comprises an actuation sequence for different positions of the rotary slide valve 20.

Said program may be executed for example for maintenance purposes in a suitably equipped workshop. Here, the internal combustion engine 12 runs at idle. If the normal idle engine speed is not sufficient, the engine speed may be briefly raised, or else the idle engine speed may be raised to a considerably higher level for the duration of the ventilation program.

By way of targeted opening and closing of the individual coolant circuits, for example of the engine cooling circuit 36, of the main cooler circuit 46 and of the heating circuit 50, it is possible in targeted fashion for air that is present in the lines to be transported via the ventilation lines 72, 74 to the expansion tank 22, where the air is separated off.

Said actuation of the switchable inlets 42, 48, 52 of the rotary slide valve 20 is entirely independent of the control of the rotary slide valve 20 in other operating states, and serves merely for the targeted conducting of the coolant through the ventilation lines 72, 74 such that entrained air is separated off in the expansion tank 22.

It may for example be expedient for all of the inlets to be briefly closed at predetermined intervals in order to force the coolant into the ventilation line 72, 74. It is also conceivable for air to be collected in targeted fashion in components and then separated off in the expansion tank 22 by way of defined opening of the sub-circuits.

It is also possible for the individual coolant circuits to be briefly opened and closed again in rapid succession in targeted fashion in order to transfer air from one circuit into the other and thus move said air to the expansion tank 22.

It is likewise possible for in each case only precisely one of the circuits to be operated in targeted fashion and for valves that may be provided on the ventilation lines 72, 74 to be opened and closed in targeted fashion.

The one or more ventilation programs are stored in the control unit 54 and may be executed in a maintenance mode or in an assembly mode, wherein the control sequence is then run through automatically.

Figure 2:
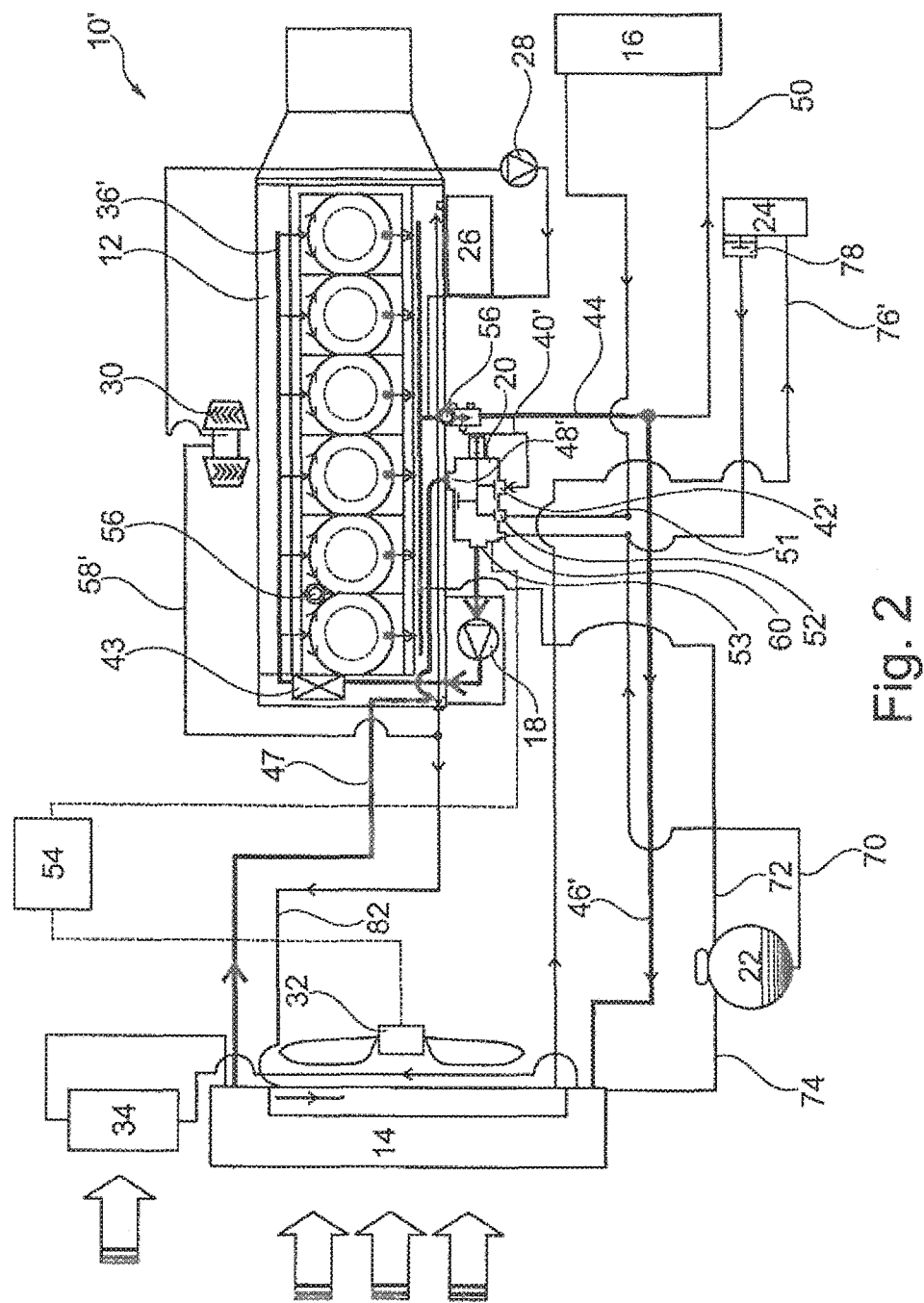
FIG. 2 shows a schematic view of a heat management system according to another embodiment of the invention.

FIG. 2 shows a second embodiment of a heat management system 10', wherein for components that have already been introduced, the reference designations already known are used again. Modified but similar components are denoted by the known reference designations with an apostrophe suffix.

By contrast to the embodiment illustrated in FIG. 1, the internal combustion engine 12' is in this case a six-cylinder in-line engine, which, for space reasons, has the effect that the rotary slide valve 20 is arranged not on an end side but along a long side of the engine block of the internal combustion engine 12.

Likewise for space reasons, the return line 47' of the main cooler circuit 46' leads, in part, through the engine block of the internal combustion engine 12 to the switched inlet 48' of the rotary slide valve 20.

In terms of physical arrangement in the rotary slide valve 20, the inlet 42' in the second embodiment corresponds to the inlet 42 in the first embodiment, and vice versa. The function of the rotary slide valve 20 is however analogous to that in the first embodiment.

In this embodiment, the return line of the exhaust-gas turbocharger cooling circuit 58' issues into the line 44 upstream of a branch of the bypass line 40' to the rotary slide valve 20.

The feed line of the exhaust-gas turbocharger cooling circuit 58' branches off, downstream of an outlet from the engine block, from a feed line 82 of the transmission oil cooling circuit 76' to the main cooler 14. As in the first example, the return line of the transmission oil cooling circuit 76' leads from the transmission oil heat exchanger 24 to the non-switched inlet 60 of the rotary slide valve 20.

Here, the connecting line 70 from the coolant expansion tank 22 issues into the return line of the transmission oil cooling circuit 76', which leads to the non-switched inlet 60 of the rotary slide valve 20.

All of the features not described in conjunction with FIG. 2 are identical in terms of construction and function to those described in FIG. 1.

As shown by the two embodiments described above, the principle according to the invention of the use of a rotary slide valve with switched and non-switched inlets for the targeted disconnection of a heating circuit and for the switching of the engine circuit and of the main cooler circuit, but also of the central connection of further cooling circuits such as for example the transmission oil cooling circuit and the exhaust-gas turbocharger cooling circuit, can be easily implemented in a flexible manner for different internal combustion engines. Correspondingly, a person skilled in the art is afforded great freedom in designing heat management systems according to the invention, wherein all of the features of the two embodiments may be combined with one another, or exchanged for one another, as desired.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A heat management system for an internal combustion engine, comprising:
   an engine cooling circuit;
   a main cooler circuit having a main cooler;
   a heating circuit having a heating heat exchanger;
   a coolant pump configured to moves coolant through the engine cooling circuit, main cooler circuit and heating circuit; and
   a rotary slide valve having at least one switched and at least one non-switched inlet,
   wherein a heating return line of the heating circuit issues into one of the at least one switched inlets of the rotary slide valve, and
   wherein the rotary slide valve further comprises a non-switched outlet coupled to the coolant pump.

2. The heat management system as claimed in claim 1, wherein at least one of a return line of the main cooler circuit and a return line of the engine cooling circuit issues into one of the at least one switched inlets of the rotary slide valve.

3. The heat management system as claimed in claim 2, further comprising a transmission oil cooling circuit having a transmission oil heat exchanger is provided, wherein a return line of the transmission oil cooling circuit issues into a non-switched inlet, of the at least one non-switched inlets, of the rotary slide valve.

4. The heat management system as claimed in claim 2, further comprising an additional, electric coolant pump arranged in an exhaust-gas turbocharger cooling circuit.

5. The heat management system as claimed in claim 4, wherein the rotary slide valve is configured to be switched such that warm coolant is conducted into the heating circuit by way of the additional, electric coolant pump.

6. The heat management system as claimed in claim 1, further comprising a transmission oil cooling circuit having a transmission oil heat exchanger is provided, wherein a return line of the transmission oil cooling circuit issues into a non-switched inlet, of the at least one non-switched inlets, of the rotary slide valve.

7. The heat management system as claimed in claim 6, wherein a dedicated thermostat valve is provided in the transmission oil cooling circuit.

8. The heat management system as claimed in claim 6, further comprising an additional, electric coolant pump arranged in an exhaust-gas turbocharger cooling circuit.

9. The heat management system as claimed in claim 8, wherein the rotary slide valve is configured to be switched such that warm coolant is conducted into the heating circuit by way of the additional, electric coolant pump.

10. The heat management system as claimed in claim 1, further comprising an expansion tank for coolant that is connected to a non-switched inlet of the rotary slide valve.

11. The heat management system as claimed in claim 1, further comprising an additional, electric coolant pump arranged in an exhaust-gas turbocharger cooling circuit.

12. The heat management system as claimed in claim 11, wherein the rotary slide valve is configured to be switched such that warm coolant is conducted into the heating circuit by way of the additional, electric coolant pump.

13. The heat management system as claimed in claim 1, further comprising a control unit and temperature sensors, wherein the rotary slide valve is configured to be switched by the control unit in a manner dependent on data determined by the temperature sensors.

14. The heat management system as claimed in claim 1, wherein the rotary slide valve is configured to be switched such that a flow through the engine cooling circuit is throttled.

15. The heat management system as claimed in claim 1, wherein the rotary slide valve is configured to be switched such that, in a warm-up phase of the internal combustion engine, all of the at least one switched and at least one non-switched inlets of the rotary slide valve are closed.

* * * * *